April 7, 1931. T. O. DUGGER 1,800,058
PICK-UP FOR CORN HARVESTERS
Filed March 21, 1930 3 Sheets-Sheet 1

Thomas O. Dugger INVENTOR
BY Victor J. Evans
ATTORNEY

April 7, 1931. T. O. DUGGER 1,800,058
PICK-UP FOR CORN HARVESTERS
Filed March 21, 1930 3 Sheets-Sheet 2
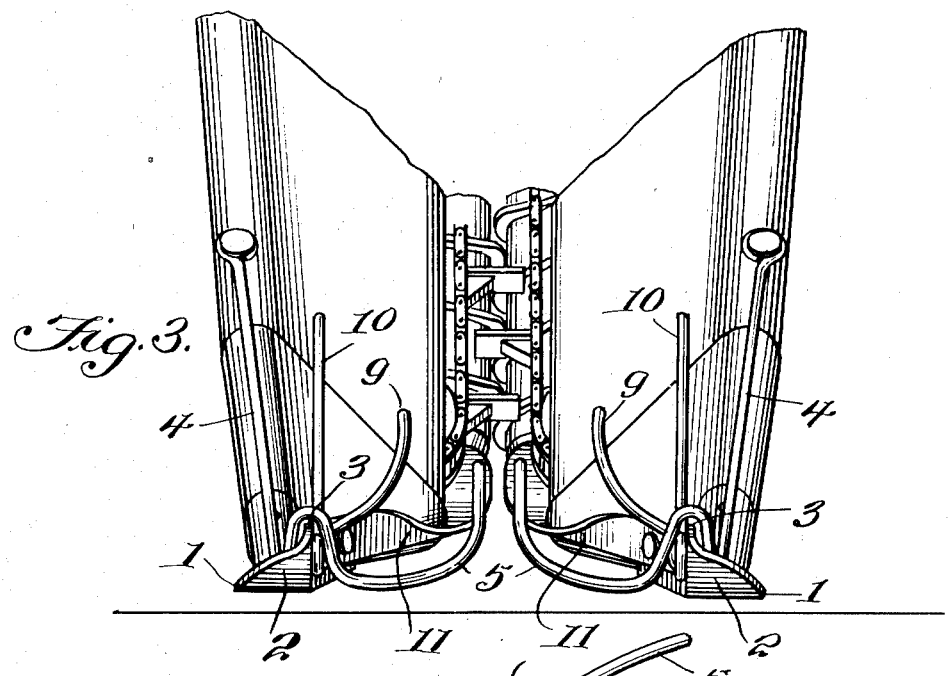
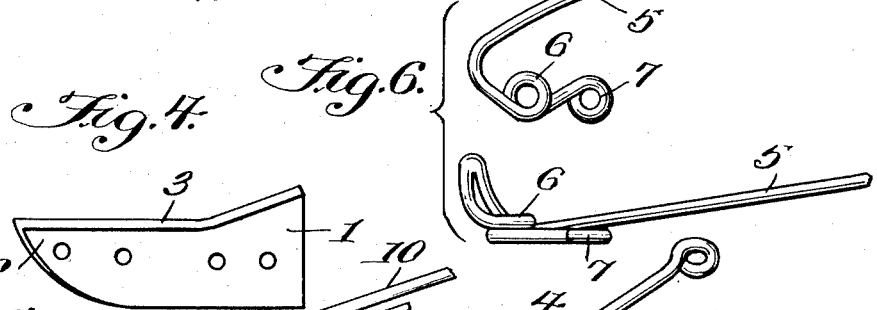
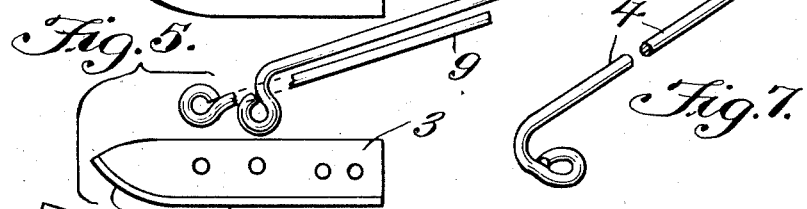

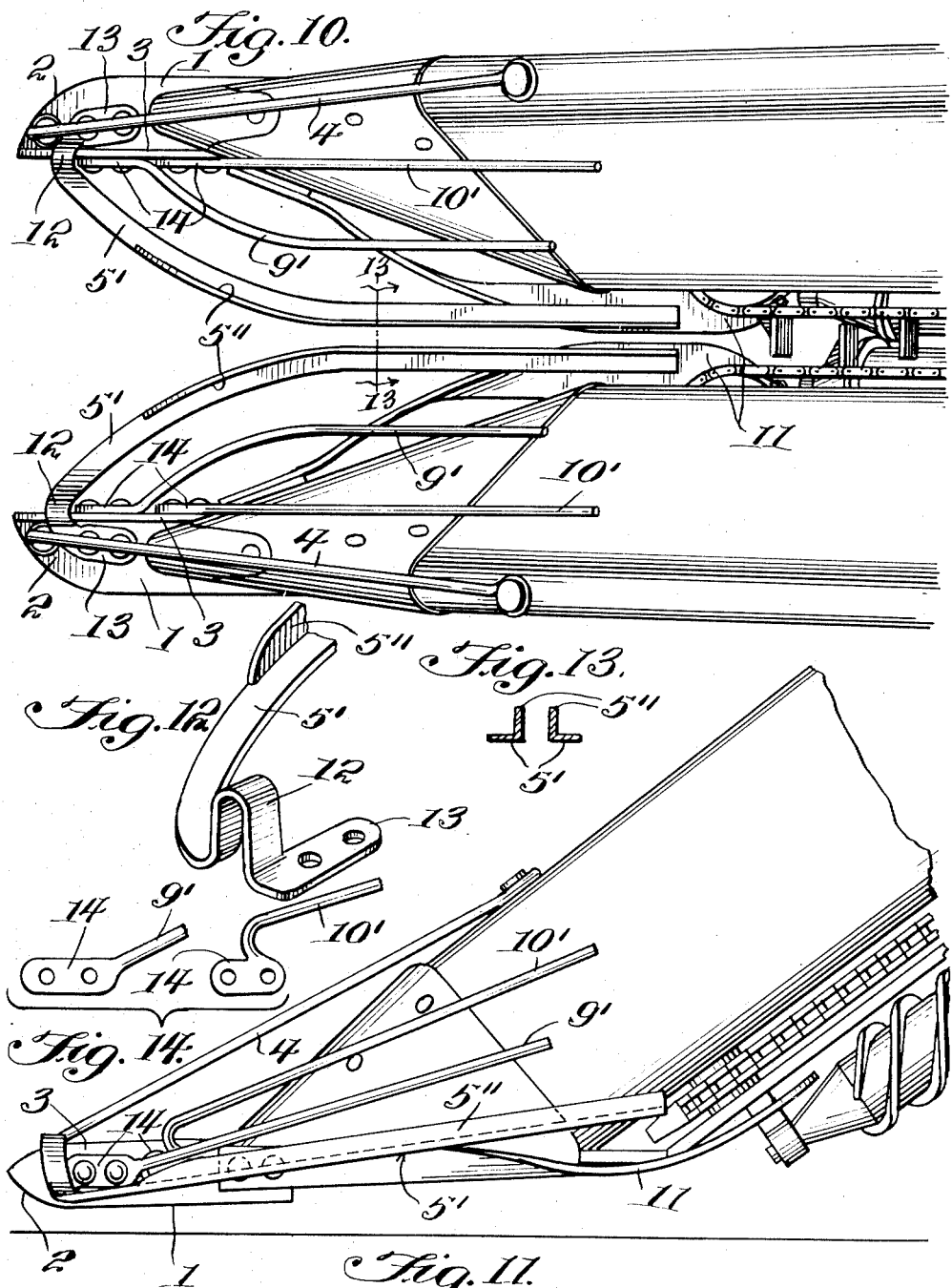

Patented Apr. 7, 1931

1,800,058

UNITED STATES PATENT OFFICE

THOMAS O. DUGGER, OF BRIDGEPORT, NEBRASKA

PICK-UP FOR CORN HARVESTERS

Application filed March 21, 1930. Serial No. 437,871.

This invention relates to a pick-up for corn harvesters, the general object of the invention being to provide means for harvesting the ears from knock-down stalks or the low growing ears on the stalks as well as ears that are lying upon the ground.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 3 is a front view of Figure 1.

Figure 4 is a view of one of the shoes forming a part of the invention.

Figure 5 is a side view of one of the shoes and showing the trough forming bars separated therefrom.

Figure 6 shows two views of the stripper rod.

Figure 7 is a view of one of the braces.

Figure 8 is a plan view of one of the spring fingers.

Figure 9 is an edge view thereof.

Figure 10 is a view similar to Figure 1, but showing a modification.

Figure 11 is an elevation looking toward the inner side of one of the front parts of the machine.

Figure 12 is a perspective view of the front end of one of the stripper bars of the modification.

Figure 13 is a section on line 13—13 of Figure 10.

Figure 14 shows the front ends of two of the trough forming bars.

Figure 1:
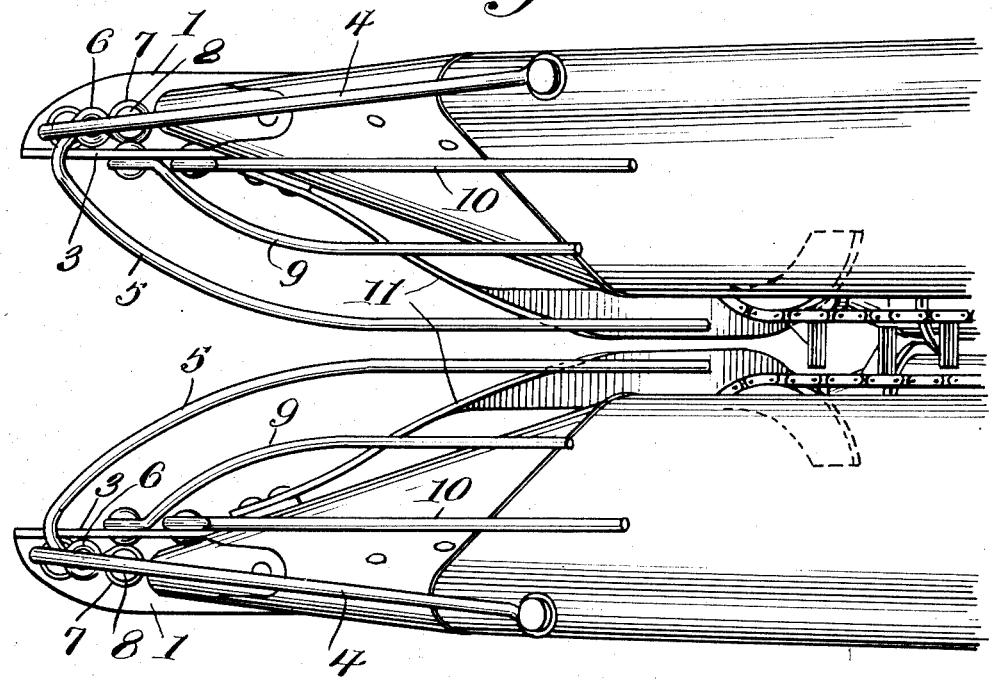
Figure 1 is a top plan view of the front part of a corn harvester, showing the invention applied thereto.
Figure 2:
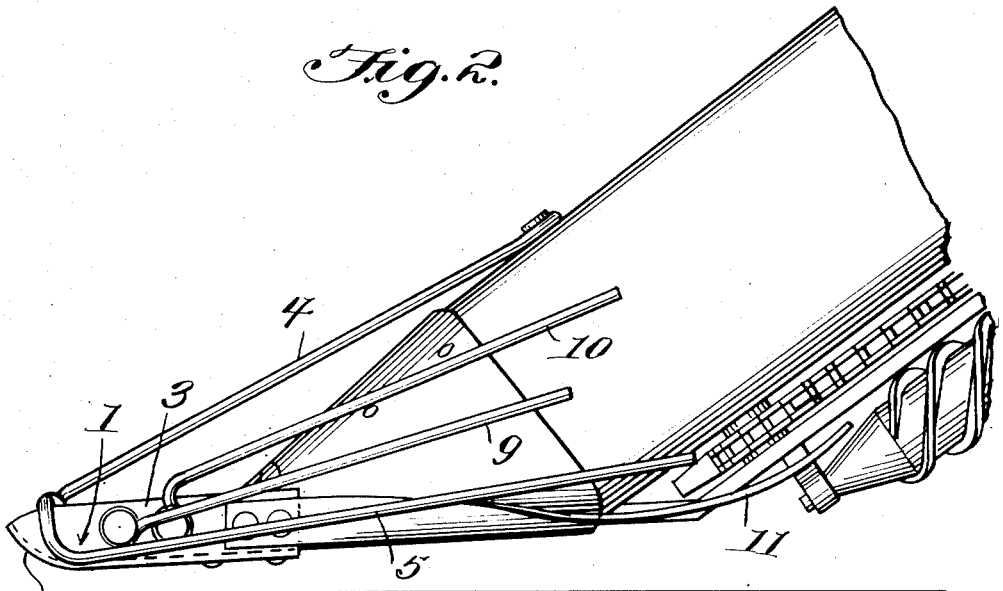
Figure 2 is a view looking toward the inner side of the lower end of one of the sections of the picker.

As shown in these views, a shoe 1 is suitably attached to the front end or shoe of each section of the picker, each shoe 1 having its front end turned up, as shown at 2, to form a runner-like device, with its inner edge turned up at right angles, as shown at 3. A brace rod 4 is attached to the front part of each shoe 1 and to a part of the machine so as to brace the shoe. A spring stripper rod 5 has its front end bent and formed with the coil 6 and the eye 7, the eye receiving a rivet 8 or the like which attaches the front end of the stripper rod to the shoe. As shown, each stripper rod 5 extends forwardly and is then bent over the flange 3 of the shoe 1. The rod is then curved rearwardly into the space between the front ends of the two sections of the apparatus, with the rear portions of the two rods 5 extending parallel to each other and slightly spaced apart. These parallel portions extend upwardly and rearwardly to a point above the lower end of the snapping rolls so that they will raise and strip the low ears from the stalks and convey them, with the help of the standing stalker, to the husking machine. While the drawings show the rods formed with a coil, it is not absolutely necessary to so form them and they may be fastened at their rear ends, if desired. They may be of any cross sectional shape.

Rods 9 and 10 have their front ends connected with the flange 3 and extend upwardly and rearwardly, with the rod 9 curving into the space between the noses of the apparatus, and these rods are slightly spaced from each other and from the stripper rods, these rods 9 and 10 forming the sides of a trough, the bottom of which is formed by the stripper rods 5. Thus the ears of corn will be picked up by the stripper rods 5 and caused to move upwardly to the snapping rolls of the apparatus and the ears are kept from falling off the rods 5 by the rods 9 and 10.

A spring finger 11, preferably of the shape shown in Figures 8 and 9, is each attached at its front end to the rear part of the flange of each of the shoes 1, with the rear part of the tongue bent into a flat plane and its extremity curved outwardly. These tongues act to prevent the ears from dropping under the parts and they help the other parts to direct the ears to the snapping rolls.

In the modification shown in Figures 10 to 14, the stripper members 5' are each formed of a flat strip with a flange 5'' on its inner edge, the flange terminating short of the front part of the member, as shown in Figure 12. Said front end of each member is formed with an upstanding loop 12 which clears the flange of the shoe and said loop is connected with a flat part 13 which is riveted or otherwise fastened to the shoe. In this case, the trough forming bars 9' and 10' are also formed with flattened front ends 14 through which the rivets or other fastening means pass, which fasten the front ends to the flange of the shoe. In other respects, this form of the invention is similar to that just described.

The flat stripping bars or members, with the flanges, act to more firmly grip the ears and more readily pull the ears from the stalks before the ears are delivered to the machine. This form of invention is well adapted for use where the ears of corn are very low and it is impossible to reach them with an ordinary machine.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:—

1. In combination with a corn harvesting machine, a shoe connected with the front end of each shoe of the machine, a stripper member having its front end connected with each first mentioned shoe, each member curving inwardly into the space between the front portions of the machine and extending to a point adjacent the snapping rollers, whereby said members will pick up ears of corn on the ground or adjacent the ground and convey said ears to the snapping rollers of the machine.

2. In combination with a corn harvesting machine, a shoe connected with the front end of each shoe of the machine, a stripper member having its front end connected with each first mentioned shoe, each member curving inwardly into the space between the front portions of the machine and extending to a point adjacent the snapping rollers, whereby said members will pick up ears of corn on the ground or adjacent the ground and convey said ears to the snapping rollers of the machine, and bars connected with the shoes and extending rearwardly and upwardly for preventing the ears of corn from dropping from the stripping members.

3. In combination with a corn harvesting machine, a shoe connected with the front end of each shoe of the machine, a stripper member having its front end connected with each first mentioned shoe, each member curving inwardly into the space between the front portions of the machine and extending to a point adjacent the snapping rollers, whereby said members will pick up ears of corn on the ground or adjacent the ground and convey said ears to the snapping rollers of the machine, bars connected with the shoes and extending rearwardly and upwardly for preventing the ears of corn from dropping from the stripping members and spring fingers connected with the shoes and extending rearwardly, with their rear portions flat to prevent ears of corn from dropping between the parts upon the ground.

4. In combination with a corn harvesting machine, a shoe connected with the forward end of each section of the machine, each shoe having an upstanding flange at its inner edge with its front end turned upwardly, a brace for connecting each shoe with the machine, a stripper member having its front end connected with each shoe, said member having its front part curving inwardly and rearwardly into the space between the two sections, with the rear parts of the two members parallel and spaced apart and extending to a point adjacent the snapping rollers of the machine, bars connected with the flanges, said bars, with the stripping members, forming a trough through which the ears of corn pass to the snapping rollers.

In testimony whereof I affix my signature.

THOMAS O. DUGGER.